Figure 1:
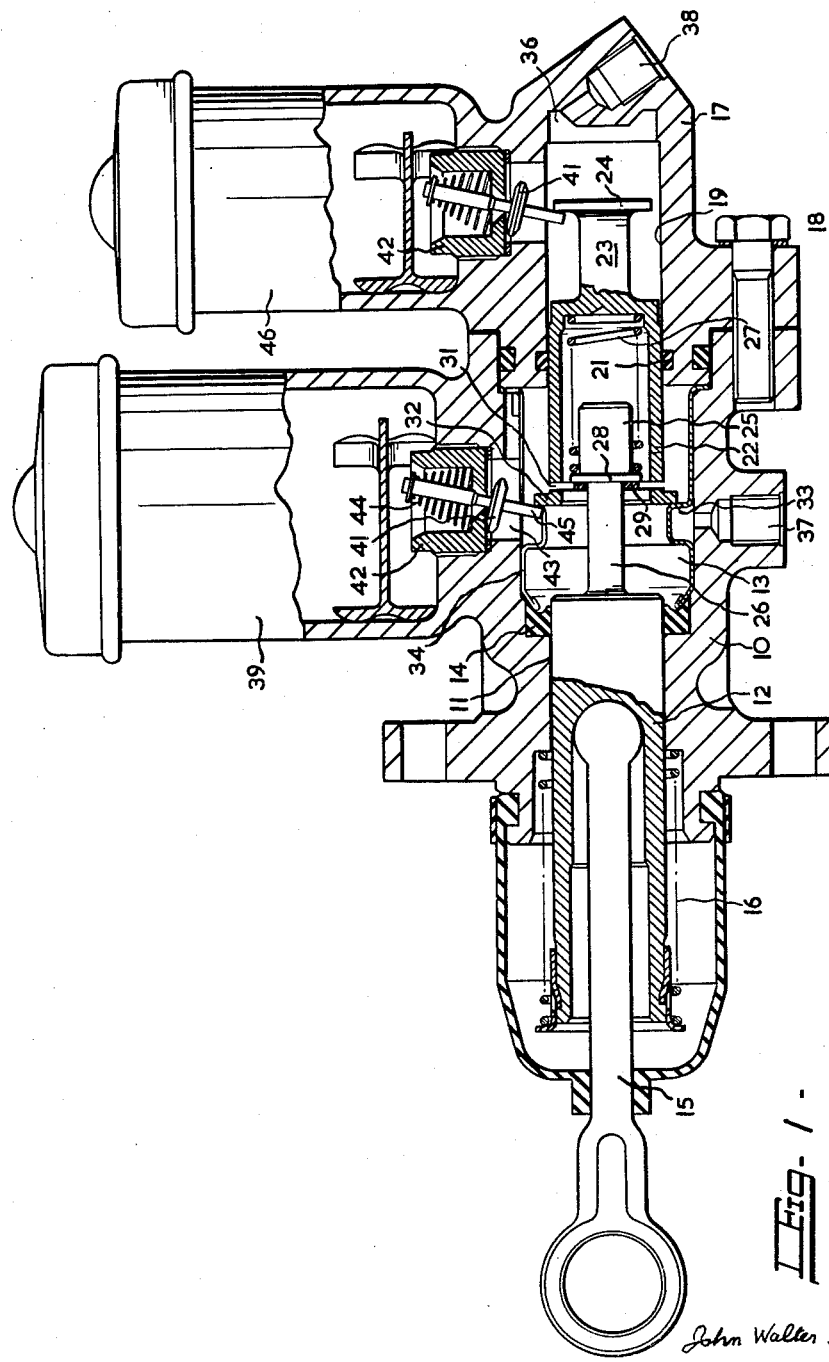

Oct. 30, 1962 J. W. DAVIS 3,060,691
HYDRAULIC MASTER CYLINDER

Filed April 25, 1961 2 Sheets-Sheet 1

John Walter Davis
By: Scrivener & Parker,
Attorneys

Oct. 30, 1962 J. W. DAVIS 3,060,691
HYDRAULIC MASTER CYLINDER
Filed April 25, 1961 2 Sheets-Sheet 2
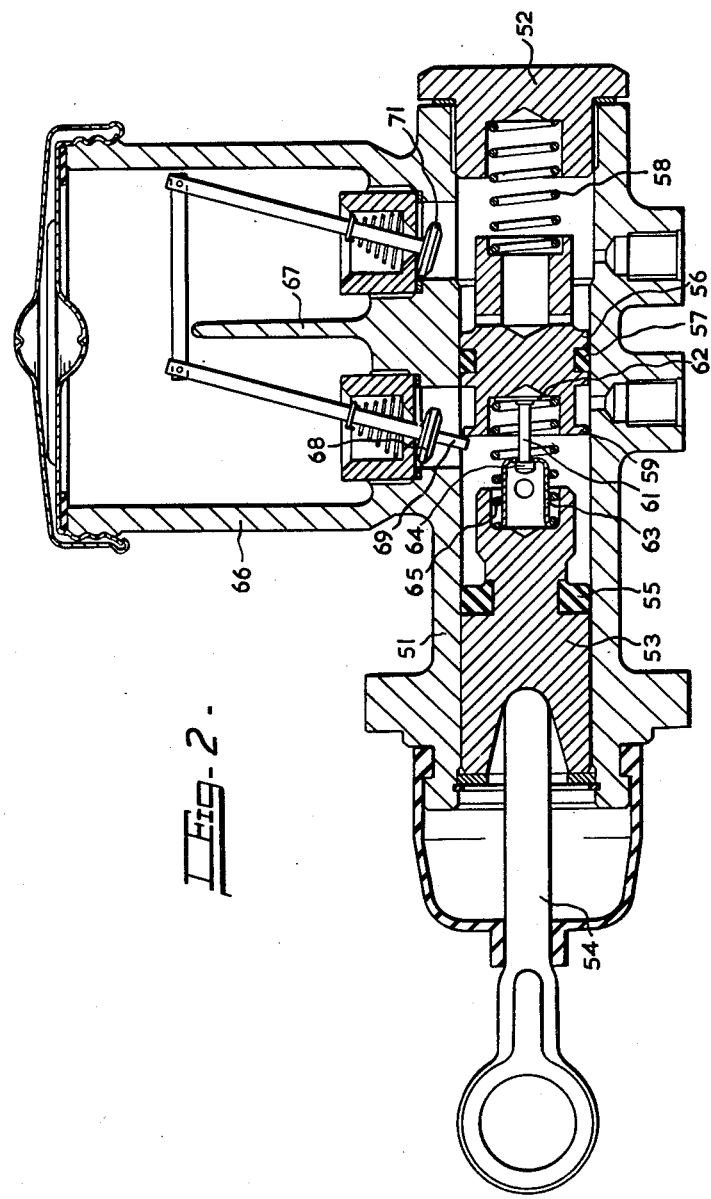
Fig-2-
John Walter Davis
By: Scrivener & Parker
Attorneys cylinder. The piston is actuated by a thrust rod 15 which enters an axial recess in the outer end of the piston and the outer end of which is coupled by any convenient means to a pedal. When the pedal is released, the piston is retracted by a spring 16.

A second body part 17 secured by bolts 18 to the main body part has a cylindrical bore 19 in axial alignment with the bore 11. A sealed joint is made between the two body parts by a spigot on the part 17 entering a counterbore at the forward end of the chamber 13, a sealing ring 21 being located in an annular groove in the spigot.

A floating piston 22 working in the bore 19 has on its forward end a reduced extension 23 terminating in a radially extending flange 24. The main part of the piston is formed with a longitudinal axial recess into which enters a head 25 on the forward end of a reduced extension 26 of the main piston 12. A compression spring 27 is located between the inner end of the recess and a radial shoulder 28 on the rear end of the head 25 to urge the pistons apart, their separation being limited by a U-shaped clip 29 which fits into opposed slots 31 in the piston 22 and provides an abutment for the rear end of the head 25. At its rear end the floating piston 22 has a radially projecting flange 32, which in the fully retracted position of the piston shown in the drawing abuts against an internal annular shoulder 33 in a skeleton liner 34 located in the chamber 13 and serving as a retainer for the seal 14.

Communication between the chamber 13 and a fluid reservoir 39 is controlled by a valve 41 mounted in a valve body 42 screwed into the upper end of a passage 43 extending from the chamber into the reservoir. The valve is biassed towards the closed position by a spring 44 and has a stem 45 projecting inwardly into the path of the flange 32 on the rear end of the piston 22.

Communication between the pressure space 36 in front of the floating piston 22 and a reservoir 46 is controlled by a similar valve to which the same references have been applied, the stem of this valve projecting inwardly into the path of the flange 24 on the forward end of the piston 22.

The positions and spacing of the valves are such that as the piston 22 returns to its fully retracted position on release of the brake, the stems of the valves are engaged by the flanges 32 and 24 on the piston and the valves are tilted simultaneously to move them away from their seatings and to establish free communication between the reservoirs and the pressure spaces in the cylinder.

When the main piston 12 is advanced to apply the brake, the floating piston 22 moves with it, and as the piston 22 moves forwardly, both valves close simultaneously and pressure builds up simultaneously in the two pressure spaces.

In the alternative construction shown in FIGURE 2, the body 51 has a single straight-through bore closed at its forward end by a plug 52. The main piston 53, which is actuated by a pedal through a thrust rod 54, works in the rear end of the cylinder bore and is fitted with a cup seal 55.

The floating piston 56 is sealed by an annular seal 57 located in an annular groove in the piston. A return spring 58 is located between the forward end of the piston 56 and the plug 52, and on the rear end of the piston there is a radially projecting flange 59. A rod 61 is carried by a disc 62 located in a recess in the rear end of the piston 56 and passes through an axial hole in the end of a cup-shaped pressing 63 located in a complementary recess in the main piston 53, the rear end of the rod 61 having a head of greater diameter than the hole in the pressing. A compression spring 65 located between the pistons abuts at one end on the disc 62 and at the other end on a radial flange on the pressing 63.

A reservoir 66 is integral with the body of the master cylinder and is divided into two by a partition 67. Communication between the pressure space between the piston and the reservoir on one side of the partition is controlled by a valve 68 similar to the valves described above, this valve having a stem 69 projecting into the path of the flange 59 on the floating piston. Communication between the reservoir on the other side of the partition and the pressure space in front of the floating piston is controlled by a similar valve 71 but this valve has no inwardly projecting stem.

The stems of both valves however are extended away from the cylinder into the reservoir and their extremities are positively coupled by a link 72 located above the partition 67 so that both valves are unseated simultaneously when the inwardly projecting stem 69 of the valve 68 is engaged by the flange 59 on the floating piston, both valves closing simultaneously when the piston moves forwardly in the application of the brake.

I claim:

1. A master cylinder for an hydraulic system comprising a cylinder, a positively actuated main piston working in said cylinder, a floating piston working in said cylinder, separate spaces between said pistons and between the floating piston and one end of the cylinder respectively, a reservoir for working fluid, passages connecting said pressure spaces to said reservoir, and separate valves controlling said passages actuated simultaneously by one of said pistons.

2. A master cylinder for an hydraulic system comprising a cylinder, a positively actuated main piston working in said cylinder, a floating piston working in said cylinder, separate pressure spaces between said pistons and between the floating piston and one end of the cylinder respectively, a reservoir for working fluid adjacent to said cylinder, ports in the cylinder wall providing communication between said pressure spaces and the reservoir, and valves controlling said ports and actuated simultaneously by one of said pistons.

3. A master cylinder as in claim 2 wherein said valves are coupled together whereby actuation of one valve by one of the pistons causes simultaneous actuation of both valves.

4. A master cylinder as in claim 2 wherein said valves are spring-biased to the closed position and are unseated by the engagement with portions of the valves of abutments on opposite ends of the floating piston when said piston is in its retracted position.

5. A master cylinder as in claim 2 wherein said ports in the cylinder wall provide communications between the pressure spaces and separate reservoirs.

References Cited in the file of this patent

UNITED STATES PATENTS 2,332,301    Cox _____ Oct. 19, 1943

FOREIGN PATENTS 819,786    Germany _____ Nov. 5, 1951